(12) United States Patent
Takasu et al.

(10) Patent No.: US 11,632,172 B2
(45) Date of Patent: Apr. 18, 2023

(54) OTDR MEASUREMENT APPARATUS AND CONTROL METHOD

(71) Applicant: ANRITSU CORPORATION, Kanagawa (JP)

(72) Inventors: Ryota Takasu, Kanagawa (JP); Taichi Murakami, Kanagawa (JP)

(73) Assignee: ANRITSU CORPORATION, Kanagawa (JP)

( * ) Notice: Subject to any disclaimer, the term of this patent is extended or adjusted under 35 U.S.C. 154(b) by 0 days.

(21) Appl. No.: 17/470,458

(22) Filed: Sep. 9, 2021

(65) Prior Publication Data

US 2022/0123832 A1 Apr. 21, 2022

(30) Foreign Application Priority Data

Oct. 19, 2020 (JP) .............................. JP2020-175364

(51) Int. Cl.
*H04B 10/07* (2013.01)
*H04B 10/071* (2013.01)
*H04Q 11/00* (2006.01)

(52) U.S. Cl.
CPC ....... *H04B 10/071* (2013.01); *H04Q 11/0067* (2013.01); *H04Q 2011/0083* (2013.01)

(58) Field of Classification Search
CPC .............. H04B 10/071; H04B 10/0791; H04B 10/0793; H04Q 11/0067
See application file for complete search history.

(56) References Cited

U.S. PATENT DOCUMENTS

| | | | |
|---|---|---|---|
| 8,693,866 B1* | 4/2014 | Lam ..................... | H04B 10/071 398/16 |
| 2009/0190921 A1* | 7/2009 | Nakajima .......... | G01M 11/3136 398/21 |
| 2018/0006715 A1* | 1/2018 | Tyagi ................... | H04B 10/071 |
| 2022/0170765 A1* | 6/2022 | Yano .................. | G01D 5/35364 |

FOREIGN PATENT DOCUMENTS

JP 2014-081237 A 5/2014

* cited by examiner

*Primary Examiner* — Dzung D Tran
(74) *Attorney, Agent, or Firm* — Pearne & Gordon LLP

(57) ABSTRACT

It is possible to allow a user to easily distinguish between an event at a place to be resolved and an event at a place having no problem on a path of a PON communication network to be measured. A light intensity distribution of return light is processed in a time-series order to detect an event at each position on a network. A parameter N1 relating to the total number of splitters present on a path of the network is specified, the number N2 of detections of the total number of splitters detected as an event is recognized, and in a case where "N1>N2", a last detected event is associated with one optical splitter and is further displayed as an "uncertain splitter" in distinction from a normal splitter.

5 Claims, 6 Drawing Sheets

OTDR MEASUREMENT APPARATUS AND CONTROL METHOD

TECHNICAL FIELD

The present invention relates to an OTDR measurement apparatus and an OTDR control method that are available for measuring a status of an optical fiber network.

BACKGROUND ART

In general, an optical pulse tester, called an optical time domain reflectometer (OTDR), generates pulsed light with a short duration and sends the pulsed light into one end of an optical fiber to be measured. When light incident on the optical fiber propagates inside the optical fiber, part of light is bounced by internal glass and generates scattered light. The scattered light also includes scattered light, called "Rayleigh scattering". Since part of scattered light generated in the optical fiber propagates through the optical fiber and returns to an incidence end, scattered light can be observed at the incidence end of the optical fiber.

A time difference from when pulsed light is incident on the optical fiber until scattered light is observed at the incidence end of the optical fiber changes depending on the magnitude of a distance between the incidence end of the optical fiber and a location where scattered light is generated. Accordingly, a time-series change in light receiving level of scattered light observed at the incidence end of the optical fiber represents a distribution situation regarding scattered light generation of each location of the optical fiber. Such a distribution situation can be displayed with the OTDR.

For example, in a case where an OTDR measurement apparatus is connected to one end of a communication network consisting of a transmission path of an optical fiber, information representing a configuration or a status in each part of the communication network can be obtained. Specifically, reflection or magnitude of a loss for normal transmission generated at a place of an optical connector for connecting optical fibers, or reflection or the presence or absence of an abnormal loss generated due to connection defect, deterioration, or the like can be specified for each location. Furthermore, a location where a loss is generated can be specified based on the time difference from when pulsed light is incident on the optical fiber until scattered light is observed at the incidence end.

For example, an optical fiber transmission characteristic measurement apparatus of Patent Document 1 discloses a technique for allowing a measurement worker who is not familiar with the characteristics of a passive optical network (PON) to efficiently measure the PON. Specifically, the optical fiber transmission characteristic measurement apparatus is provided with a measurement mode selection unit that selects a PON mode, a measurement path selection unit that selects a path to be measured in the PON mode, an optimum initial value selection unit that selects an initial value optimum for the path selected by the measurement path selection unit, and a display unit that graphically displays the path to be measured in the PON mode.

RELATED ART DOCUMENT

Patent Document

[Patent Document 1] JP-A-2014-81237

DISCLOSURE OF THE INVENTION

Problem that the Invention is to Solve

Incidentally, for example, a transmission path of a communication network for connecting a building for a communication provider and many subscriber homes consists of optical fibers in recent years. In such a communication network, a PON configuration is often made from a viewpoint of suppressing costs for laying the optical fibers.

In an example of a representative PON communication network 50 shown in FIG. 6, one splitter 53 is disposed between a building 51 and many subscriber homes 52-1 to 52-N. The building 51 and the splitter 53 are connected by one optical fiber 54, and the splitter 53 and the subscriber homes 52-1 to 52-N are connected by individual optical fibers 55-1 to 55-N. That is, a path of light is branched by the splitter 53. Accordingly, even in a case where a communication service is provided for many subscriber homes 52-1 to 52-N, costs for laying the optical fiber 54 for connecting the building 51 and the splitter 53 can be suppressed. For example, in a case where many subscriber homes 52-1 to 52-N are present at locations close to one another, such as a residential complex (condominium, apartment, or the like), the length of the optical fibers 55-1 to 5-N downstream of the splitter 53 is short, and thus, costs for laying the optical fibers of the whole network is significantly reduced.

The number of splitters 53 constituting the PON communication network 50 is increased or decreased as needed. Accordingly, in the middle of a path between the building 51 and one subscriber home 52, one or a plurality of splitters 53 connected in series with respect to a direction of the path are present.

In such a PON communication network 50, normally, since the path is branched at a place of each splitter 53, a comparatively large loss is generated. Furthermore, a certain degree of loss or reflection is generated in a connection point present at a place of each subscriber home 52 even in a normal state. A light intensity distribution shown in FIG. 6 corresponds to a time-series change (difference in distance D) in light intensity of return light (observable light) reaching the OTDR in a case where the OTDR is connected to the building 51.

As shown in FIG. 6, since light is gradually attenuated as the distance increases, the intensity of received backscattered light is decreased depending on the distance. Furthermore, the light intensity of received light is decreased due to a loss generated at each point, such as the splitter 53. In addition, the light intensity of received light fluctuates due to light reflection or the like generated at each point where a connector or the like is present.

The fluctuation is influenced by an optical pulse waveform sent from the OTDR, and in particular, a pulse width. The light intensity fluctuation at a distance close to about the pulse width cannot be distinguished from the sent optical pulse waveform, and accordingly, becomes a dead zone, and the light intensity distribution cannot be correctly analyzed. For example, in a case of analyzing light intensity fluctuation generated near distances D3 to D4 in FIG. 6, the influences of respective points of the subscriber homes 52-2 to 52-4 cannot be separated from one another. Accordingly, failure generated at the subscriber home 52-2 cannot be distinguished from failure generated at the subscriber home 52-3.

Incidentally, for example, in a case where a loss generated in the splitter 53 is extremely large, there is a possibility that backscattered light generated in each of the optical fibers 55-1 to 55-N and the like downstream of the splitter 53 is equal to or lower than a noise floor level in light receiving intensity of the OTDR connected to a place of the building 51. In this case, since a difference in light intensity between an entrance and an exit of the splitter 53 cannot be correctly detected, the OTDR cannot measure the magnitude of a loss actually generated in the splitter 53.

In a PON communication network in which a plurality of splitters 53 are multiple-connected to be in series toward the direction of the path, there is a possibility that the OTDR cannot recognize the presence of another splitter 53 connected on a downstream side due to a loss generated in one splitter 53 connected on an upstream side.

For example, in the optical fiber transmission characteristic measurement apparatus shown in Patent Document 1, the optimum initial value selection unit selects the initial value optimum for the path selected by the measurement path selection unit. However, since the characteristics of the PON communication network in a case where a plurality of splitters 53 are multiple-connected are not sufficiently considered, the problem described above cannot be solved in the related art. That is, since an appropriate threshold value cannot be individually allocated for each splitter 53, the splitter 53 on the downstream side cannot be recognized.

For example, there is a case where the OTDR recognizes an event where a loss exceeding a threshold value determined in advance is generated at a certain point on the path of the PON communication network. Then, even when the event is a normal event caused by the configuration or characteristic of the PON communication network, such as the splitter present in the network, there is a possibility that the OTDR displays the event as a "failure" having a problem. In this case, the worker that operates the OTDR is highly likely to perform work for searching a cause to remove the displayed "failure", and spends time and labor for wasteful work in a case where the worker is not a worker who is familiar with the configuration or the characteristic of the PON communication network in advance.

The invention has been accomplished in view of the above-described situation, and an object of the invention is to provide an OTDR measurement apparatus and a control method that allow a user, such as a worker, to easily distinguish between an event at a place to be resolved and an event at a place having no problem on a path of a PON communication network to be measured.

Means for Solving the Problem

To achieve the above-described object, an OTDR measurement apparatus and a control method according to the invention are characterized by the following (1) to (5).

(1) An OTDR measurement apparatus that sends pulsed light into an optical fiber network to be measured and observes return light from the optical fiber network to measure a status of the optical fiber network, the apparatus including a parameter decision unit that specifies a parameter N1 of the total number of optical splitters included in the optical fiber network in a case where the optical fiber network is a PON, an event detection unit that detects each phenomenon generated corresponding to a configuration and the status of the optical fiber network as an event based on an observation status of a time-series level change of the return light and associates each of the optical splitters included in the optical fiber network with each event, a last event decision unit that associates an event last detected by the event detection unit with one optical splitter in a case where the number N2 of detections of the total number of optical splitters detected by the event detection unit is smaller than the parameter N1, and a user support processing unit that explicitly outputs information regarding the last detected event as an uncertain splitter in distinction from other optical splitters in a case where the number N2 of detections is smaller than the parameter N1.

(2) The OTDR measurement apparatus described in (1) described above, in which the user support processing unit includes a normality information output unit that, for a specific event classified into the uncertain splitter, inhibits determination processing regarding magnitude of a loss in a part of the specific event and outputs information representing that the loss is normal.

(3) The OTDR measurement apparatus described in (1) or (2), in which, even though backscattered light is incapable of being detected due to a dead zone behind one optical splitter, the user support processing unit explicitly outputs information regarding an event corresponding to the optical splitter as an uncertain splitter in distinction from other optical splitters.

(4) The OTDR measurement apparatus described in (2) described above, in which the normality information output unit has a user operation unit that switches on and off of a function of inhibiting determination processing regarding magnitude of a loss in a part of the specific event.

(5) A control method for controlling an OTDR measurement apparatus that sends pulsed light into an optical fiber network to be measured and observes return light from the optical fiber network to measure a status of the optical fiber network, the method including a parameter decision step of specifying a parameter N1 of the total number of optical splitters included in the optical fiber network in a case where the optical fiber network is a PON, an event detection step of detecting each phenomenon generated corresponding to a configuration and the status of the optical fiber network as an event based on an observation status of a time-series level change of the return light and associating each of the optical splitters included in the optical fiber network with each event, a last event decision step of associating a last detected event with one optical splitter in a case where the number N2 of detections of the total number of optical splitters is smaller than the parameter N1, and a user support processing step of explicitly outputting information regarding the last detected event as an uncertain splitter in distinction from other optical splitters in a case where the number N2 of detections is smaller than the parameter N1.

With the OTDR measurement apparatus having the configuration of (1) described above, the user who operates the OTDR, such as a worker, can recognize the last detected event as an "uncertain splitter". That is, since a loss is large in the splitter in the PON communication network, it is possible to automatically recognize each event, such as the splitter, by comparing a detection value of a loss at each point detected based on a light intensity distribution of return light with a threshold value. Furthermore, since the loss of each splitter is large, there is a case where the total number (N2) of splitters detected by the OTDR is smaller than the total number (N1) of splitters actually present in the PON communication network. That is, backscattered light is equal to or lower than a noise level downstream of the last detected event. In this case, the last detected event (characteristic loss) is highly likely to be caused by the influence of the splitter. Note that, since the event is likely to be caused by a factor other than the splitter, and the loss value cannot be correctly recognized, the event is explicitly output as an "uncertain splitter", making it possible to support even a worker or the like who is not familiar with the PON communication network, to correctly recognize a situation.

With the OTDR measurement apparatus having the configuration of (2) described above, the specific event classified into the uncertain splitter can be avoided from being displayed as failure or the like. That is, since backscattered light is equal to or lower than a noise level on a downstream side at a place of an uncertain splitter, a correct loss of the specific event cannot be detected. The worker or the like who is not familiar with the PON communication network can correctly recognize a situation by displaying such a place as a normal event having no problem rather than comparing the detected loss with the threshold value to perform determination.

With the OTDR measurement apparatus having the configuration of (3) described above, even in a case where backscattered light cannot be detected due to the dead zone, the event can be explicitly output as an "uncertain splitter". In the PON communication network, the length of each optical fiber downstream of the splitter is highly likely to be extremely shorter than the length of the optical fiber upstream of the splitter. For this reason, a time interval of an event (an event of a loss due to a subscriber-side connector or the like) in each optical fiber path connected downstream of the splitter is shortened, and a situation in which the level of backscattered light cannot be correctly detected due to a dead zone occurs. In such a situation, the last detected event where subsequent backscattered light cannot be detected is highly likely to be caused by the splitter. Note that, since backscattered light downstream of the splitter cannot be detected due to the dead zone, that is, a correct loss value cannot be specified, it is desirable that the event is explicitly indicated as an "uncertain splitter". With this, the user, such as a worker, can easily recognize a situation.

With the OTDR measurement apparatus having the configuration of (4) described above, the user, such as a worker, can switch the on and off of the above-described function as needed. That is, the user turns on the function of inhibiting the determination processing regarding the magnitude of the loss in the part of the specific event, whereby the user easily avoids erroneous recognition of a normal part as an abnormal part. In a case of testing a communication network where an optical fiber behind a splitter is longer than a dead zone, an abnormal part can be correctly determined by turning off the above-described function.

With the control method having the configuration of (5) described above, the user who operates the OTDR, such as a worker, can recognize the last detected event as an "uncertain splitter". That is, since a loss is large in the splitter in the PON communication network, it is possible to automatically recognize each event, such as the splitter, by comparing a detection value of a loss at each point detected based on a light intensity distribution of return light with a threshold value. Furthermore, since the loss of each splitter is large, there is a case where the total number (N2) of splitters detected by the OTDR is smaller than the total number (N1) of splitters actually present in the PON communication network. That is, backscattered light is equal to or lower than a noise level downstream of the last detected event. In this case, the last detected event (characteristic loss) is highly likely to be caused by the influence of the splitter. Note that, since the event is likely to be caused by a factor other than the splitter, and the loss value cannot be correctly recognized, the event is explicitly output as an "uncertain splitter", making it possible to support even a worker or the like who is not familiar with the PON communication network, to correctly recognize a situation.

Advantage of the Invention

With the OTDR measurement apparatus and the control method of the invention, the user, such as a worker, easily distinguishes between an event at a place to be resolved and an event at a place having no problem on the path of the PON communication network to be measured. That is, in a case where the OTDR detects an event of a loss of each point in a time-series order from a light intensity distribution of observed return light, the last detected event can be explicitly output as an "uncertain splitter".

The invention has been briefly described above. Details of the invention will become more apparent by reading through modes for carrying out the invention (hereinafter, referred to as "embodiments") described below with reference to the accompanying drawings.

BEST MODE FOR CARRYING OUT THE INVENTION

Figure 1:
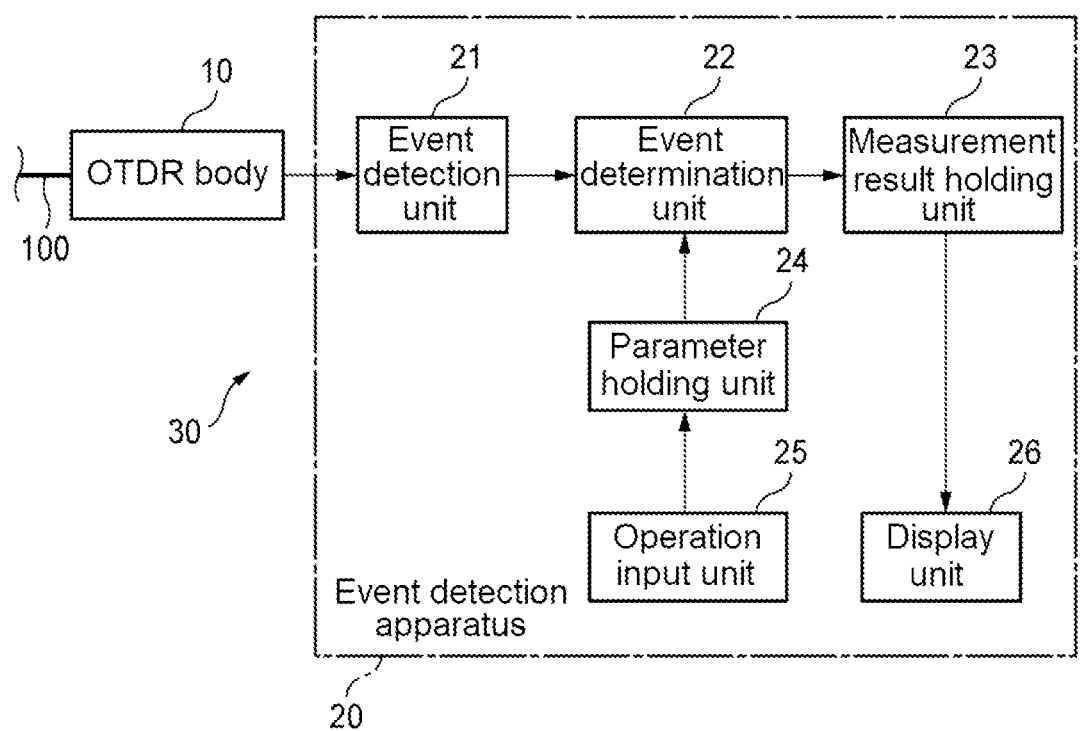
FIG. 1 is a block diagram showing a configuration example of an OTDR measurement apparatus in an embodiment of the invention.

A specific embodiment regarding the invention will be described below referring to the drawings.

<Configuration of OTDR Measurement Apparatus>

A configuration example of an OTDR measurement apparatus 30 in the embodiment of the invention is shown in FIG. 1.

The OTDR measurement apparatus 30 shown in FIG. 1 is configured with an OTDR body 10 and an event detection apparatus 20. The OTDR body 10 is connected to one end of one of an optical fiber 100 included in a communication network to be a subject.

Similarly to a general OTDR, the OTDR body 10 generates pulsed light with a short duration and sends pulsed light into one end of the optical fiber 100 to be measured. When light incident on the optical fiber 100 propagates inside the optical fiber 100, part of light is bounced by internal glass and generates scattered light including Rayleigh scattering. Since part of scattered light generated inside the optical fiber 100 propagates inside the optical fiber 100 and returns to an incidence end, the OTDR body 10 observes scattered light as return light as the incidence end of the optical fiber 100.

Figure 6:
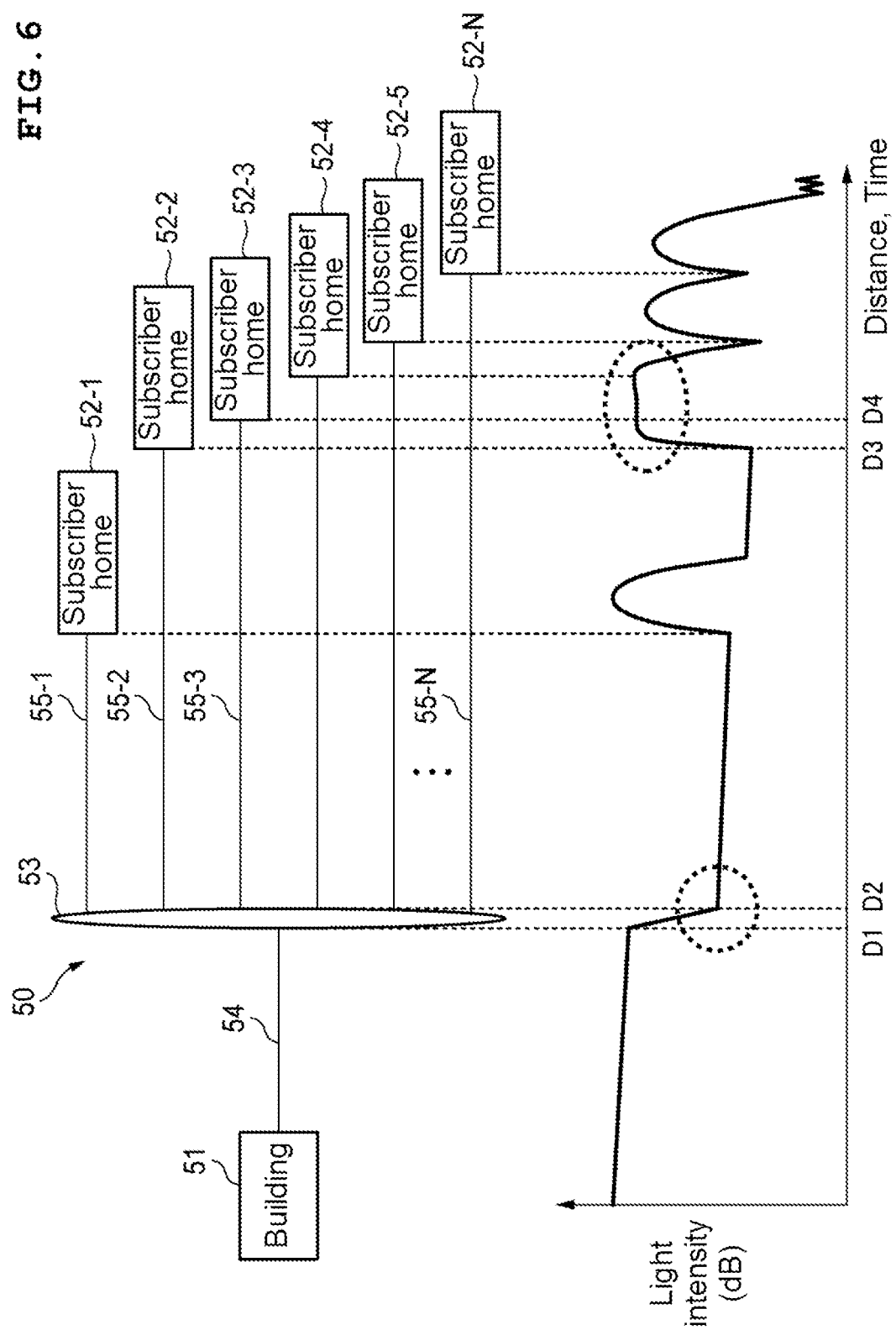
FIG. 6 is a block diagram showing a representative configuration example of a PON communication network and a light intensity distribution of return light.

A time-series change in light receiving level of scattered light observed at the incidence end of the optical fiber 100 represents a distribution situation regarding scattered light generation of each location of the optical fiber 100, and is observed as a light intensity distribution that changes in time series as shown in FIG. 6, for example.

The event detection apparatus 20 connected to the OTDR body 10 has a function of recognizing a status of each part of the PON communication network to be inspected and displaying a result based on the time-series light intensity distribution observed by the OTDR body 10. That is, the event detection apparatus 20 has a function of recognizing various events detected based on a loss, reflection, or the like of a splitter, an optical fiber, a connector, or the like of each part on the PON communication network and determining whether or not each event is normal.

The event detection apparatus 20 shown in FIG. 1 includes an event detection unit 21, an event determination unit 22, a measurement result holding unit 23, a parameter holding unit 24, an operation input unit 25, and a display unit 26.

The event detection unit 21 has a function of detecting an event of each part of the PON communication network to be inspected based on the time-series light intensity distribution of return light observed by the OTDR body 10. As a specific example, the event detection unit 21 can be configured using a known technique described in JP-A-2012-167935.

The event determination unit 22 has a function of identifying a type of each event based on a distance (position), the magnitude of a loss or reflection, or the like of each event detected by the event detection unit 21 and determining the presence or absence of failure, or the like. Information regarding various threshold values and the like needed for identifying the type of the event or determining the presence or absence of failure is held in the parameter holding unit 24.

The measurement result holding unit 23 is configured with a memory where writing and reading of data are freely performed, and can hold data of a result processed by the event determination unit 22.

The parameter holding unit 24 is configured with a nonvolatile memory and holds data of parameters, such as various predetermined threshold values. Each parameter may be updated as needed in association with a user's input from the operation input unit 25.

The operation input unit 25 is configured with various buttons operable by the user, a touch panel disposed on a screen of the display unit 26 in a superimposed manner, or the like. The operation of the OTDR measurement apparatus 30 can be controlled or the parameters held in the parameter holding unit 24 can be changed by a user's input from the operation input unit 25.

The display unit 26 has a two-dimensional display screen configured with a full-color liquid crystal display or the like. The display unit 26 displays measurement results held in the measurement result holding unit 23, displays the parameters held in the parameter holding unit 24, or can be used for displaying information needed to update each parameter.

<Configuration of PON Communication Network>

Figure 2:
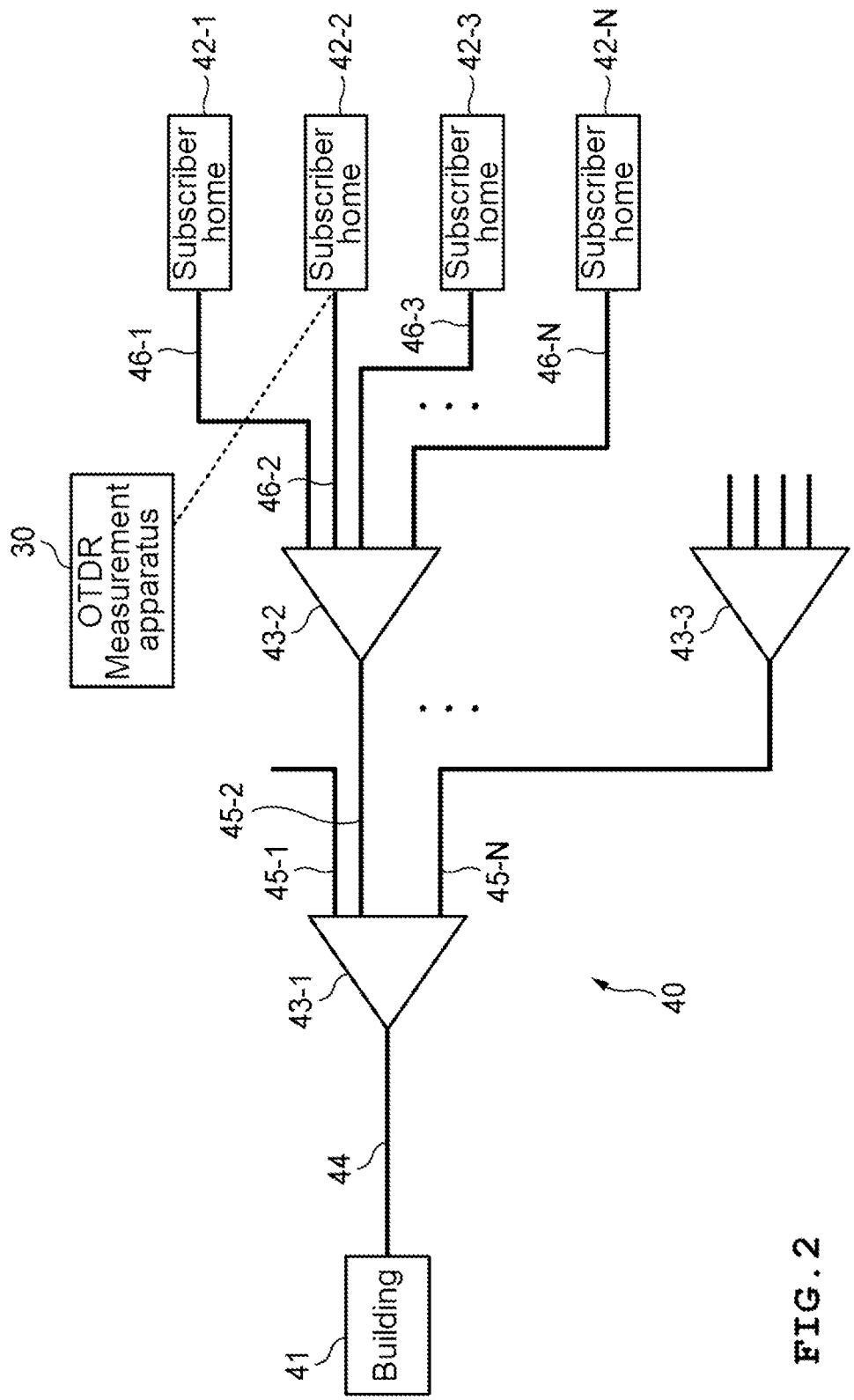
FIG. 2 is a block diagram showing a configuration example of a PON communication network including a plurality of splitters.

A configuration example of a PON communication network 40 including a plurality of splitters is shown in FIG. 2.

The PON communication network 40 shown in FIG. 2 has a plurality of splitters 43-1, 43-2, 43-3, . . . for connecting a building 41 for a communication provider and many subscriber homes 42-1, 42-2, . . . , 42-N . . . that use an optical communication service provided by the communication provider.

In the PON communication network 40, the building 41 and one end of the splitter 43-1 are connected by one optical fiber 44. A plurality of optical fibers 45-1, 45-2, . . . , and 45-N that are independent of one another are connected to the other end side of the splitter 43-1. That is, the splitter 43-1 branches a transmission path of light into a plurality of paths on the other end side of the splitter 43-1 and connects a plurality of paths to the optical fibers 45-1, 45-2, . . . , and 45-N, respectively.

Furthermore, one optical fiber 45-2 is connected between the upstream splitter 43-1 and one end of the downstream splitter 43-2. A plurality of optical fibers 46-1, 46-2, . . . , and 46-N that are independent of one another are connected to the other end side of the splitter 43-2. That is, the splitter 43-2 branches a transmission path of light into a plurality of paths on the other end side of the splitter 43-2 and connects a plurality of paths to the optical fibers 46-1, 46-2, . . . , and 46-N, respectively.

Accordingly, for example, two splitters 43-1 and 43-2 are connected in a state of being arranged in series in a communication path that connects the subscriber home 42-2 and the building 41. Since each of the splitters 43-1 and 43-2 branches one path into many paths, a comparatively large loss is generated. That is, an optical signal input one end of each of the splitters 43-1 and 43-2 is output to the other end in a state of being largely attenuated. In particular, in a case where a plurality of splitters 43-1 and 43-2 are connected in series, a plurality of large losses are added as the whole network, and accordingly, an attenuation amount of the optical signal increases.

Here, a case where the OTDR measurement apparatus 30 is connected to a connection port of the subscriber home 42-2 as shown in FIG. 2 is assumed. An optical pulse sent from the OTDR measurement apparatus 30 reaches the building 41 while being attenuated in a path passing through the optical fiber 46-2, the splitter 43-2, the optical fiber 45-2, the splitter 43-1, and the optical fiber 44 in order. Then, backscattered light generated in each part of the path reaches the OTDR measurement apparatus 30 as return light propagating in a reverse direction. However, for example, since backscattered light generated in a part, such as the optical fiber 44, passes through two splitters 43-1 and 43-2 having a large loss, backscattered light reaches the OTDR measurement apparatus 30 in a state in which light intensity is largely decreased to about a noise level.

For this reason, the OTDR measurement apparatus 30 cannot correctly recognize the light intensity of backscattered light in a part, such as the optical fiber 44. Accordingly, it is not possible to measure a loss generated in the splitter 43-1, that is, a light intensity difference between both ends of the splitter 43-1, and it is difficult to specify a type of an event detected in the part or to determine whether or not a loss of the event is normal. The same problem occurs even in a case where the OTDR measurement apparatus 30 is connected to the building 41 side.

In a case where the light intensity of backscattered light cannot be correctly recognized in a specific part due to the loss of the splitter, there is a possibility that the OTDR erroneously displays the configuration of the PON communication network 40 as a test result or erroneously displays an event at a certain point as a failure based on an incorrect measurement result. As a result, there is a possibility that the user who operates the OTDR, such as a worker, performs wasteful work for searching failure even though there is no problem in the PON communication network 40.

The OTDR measurement apparatus 30 shown in FIG. 1 has a function of solving the problem described above. This function will be described below.

<Characteristic Operation>

Figure 3:
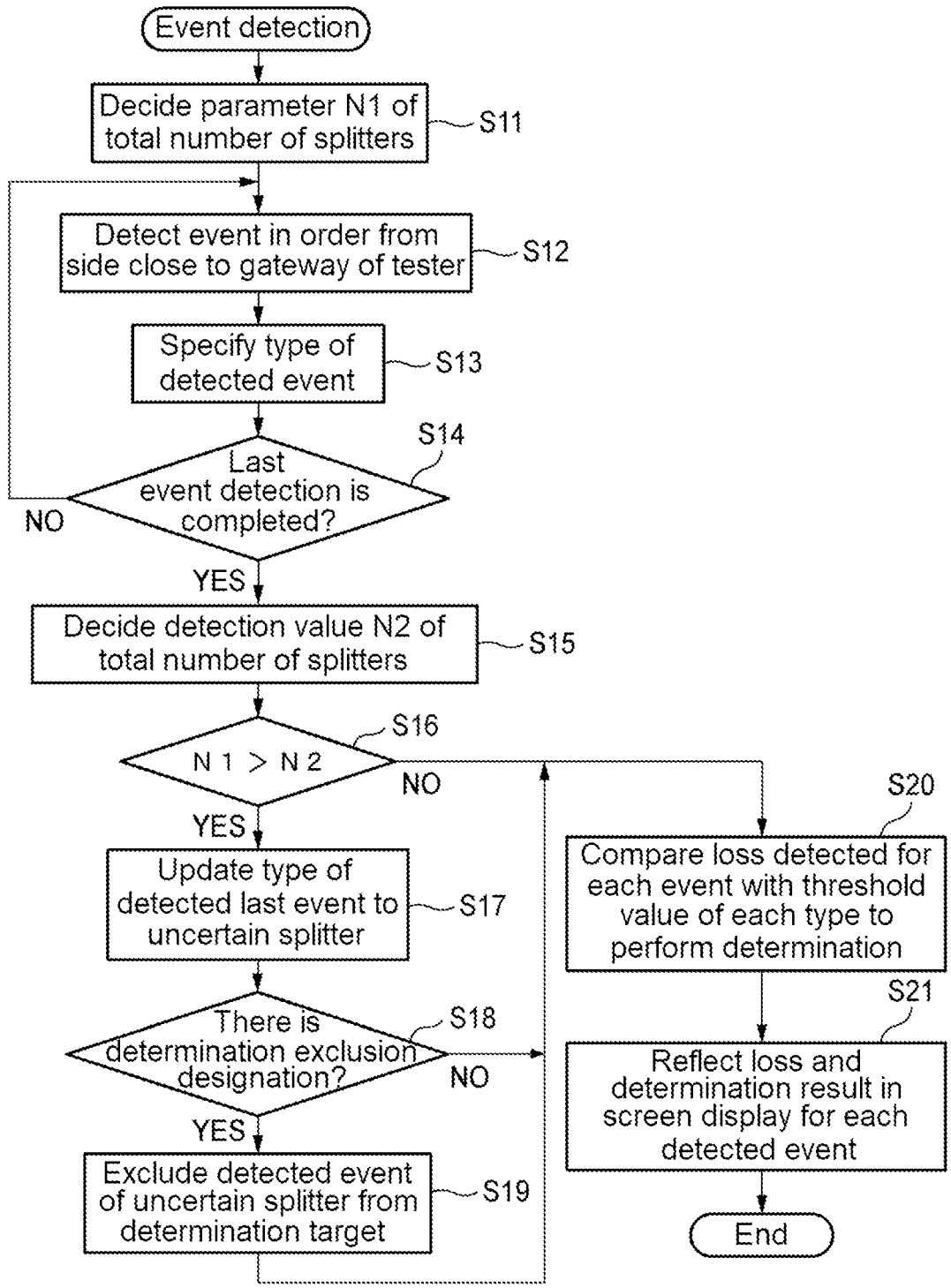
FIG. 3 is a flowchart showing a characteristic operation example of an event detection apparatus.

A characteristic operation example of the event detection apparatus 20 in the embodiment is shown in FIG. 3. The operation of FIG. 3 will be described below.

The event detection apparatus 20 decides a parameter N1 of the total number of splitters in the PON communication network 40 as an object under test initially (S11). For example, an initial value determined in advance or a numerical value input from the operation input unit 25 by the user is decided as the parameter N1. For example, in the PON communication network 40 shown in FIG. 2, in a case of testing a path of any of the subscriber homes 42-1 to 42-N, the OTDR measurement apparatus 30 is connected to the connection port of any of the subscriber homes 42-1 to 42-N or a connection port of the building 41. For this reason, the total number of splitters 43-1 and 43-2 present in the path, in this case, "2", is decided as the parameter N1.

The event detection unit 21 of the event detection apparatus 20 detects an event in order from a side at a closer distance D to a gateway of the OTDR measurement apparatus 30 as the tester, that is, in order from a part where a detection time of observed return light is earlier (S12).

For example, in a case of processing return light observed when the OTDR measurement apparatus 30 is connected to the subscriber home 42-2, there is a possibility that the following events (1) to (5) can be sequentially detected.

(1) An event related to a loss generated in a section of the optical fiber 46-2

(2) An event related to a loss generated between an entrance and an exit of the splitter 43-2

(3) An event related to a loss generated in a section of the optical fiber 45-2

(4) An event related to a loss generated between an entrance and an exit of the splitter 43-1

(5) An event related to a loss generated in a section of the optical fiber 44

The event determination unit 22 of the event detection apparatus 20 specifies the type of each event detected by the event detection unit 21 (S13). For example, light intensity tends to be decreased at a gentle slope in proportion to the distance D in a section with only the optical fiber (see FIG. 6). For this reason, in a case where this pattern is detected from the light intensity distribution, a section from a start to an end of the pattern can be recognized as an event of any one optical fiber. A loss accompanied by reflection is generated in a place of a connector (not shown), and light intensity is somewhat changed before and after the place. For this reason, an event of the connector or the like can be recognized by this pattern. A comparatively large loss is generated in a place of each splitter 43, and light intensity tends to be largely decreased before and after the place. For this reason, an event of the splitter can be recognized by this pattern.

Note that there is a possibility that an event of the splitter cannot be detected in a part where a total loss increases due to a plurality of splitters 43-1 and 43-2 and the like and the light intensity of backscattered light is decreased to about the noise level. The loss of the splitter detected in this case is highly likely to be not correct.

The event detection apparatus 20 repeats the processing of S12 to S14 until last event detection completion is recognized in S14. That is, in a case where the light intensity of return light is decreased to be equal to or lower than the noise level, further event detection is impossible, and thus, determination is made that the detection of the last event is completed.

The event detection apparatus 20 specifies a detection value N2 of the total number of splitters in a case where the detection of the last event is completed (S15). That is, the total number of events of the type recognized as "splitter" by the event determination unit 22 in S13 is set as the detection value N2.

For example, in the PON communication network 40 of FIG. 2, the detection value N2 is "2" in a case where the event determination unit 22 can correctly recognize each of the splitters 43-1 and 43-2 in the path. However, in a case where the total loss is excessively large and the light intensity of backscattered light generated on the optical fiber 44 is observed in a state of being decreased to about the noise level, the loss of the splitter 43-1 cannot be specified. For this reason, there is a possibility that the type of the splitter 43-1 is recognized as an event other than "splitter". The detection value N2 in this case is "1".

A characteristic operation of the event detection apparatus 20 is shown in another example. In a case where the optical fiber 44 shown in FIG. 2 is short, backscattered light generated in the part of the optical fiber 44 is influenced by a dead zone of the splitter 43-1. The OTDR measurement apparatus 30 cannot separate an event of the splitter 43-1 from an event at a far end of the optical fiber 44. Accordingly, an event behind the splitter 43-1 cannot be detected, and the loss of the splitter 43-1 cannot be correctly calculated. In this case, since N2=1 in S15 of FIG. 3, and N1>N2 is true in S16, the last event is substituted with an uncertain splitter.

The event detection apparatus 20 compares the parameter N1 of the total number of splitters with the detection value N2 in next S16. Then, in a case where the condition "N1>N2" is satisfied, the process progresses to S17, and in a case where both are different, the process progresses to S20.

In a case where the condition "N1>N2" is satisfied, the event determination unit 22 updates the type of the event last detected in S13 to an "uncertain splitter" (S17). The event "uncertain splitter" means that the event is likely to be caused by the splitter but is uncertain, unlike the event of the normal "splitter", and represents the magnitude of the loss detected on the event is incorrect.

The event determination unit 22 identifies the presence or absence of "determination exclusion designation" about the event "uncertain splitter" in S18. In a case where there is the designation, the process progresses to S19, and in a case where there is no designation, the process progresses to S20.

The user of the OTDR measurement apparatus 30 can select the presence or absence (on and off) of "determination exclusion designation" to the event "uncertain splitter" as needed by operating the operation input unit 25.

In a case where there is the designation, the event determination unit 22 excludes the detected event "uncertain splitter" from a determination target of the presence or absence of an abnormality (S19).

The event determination unit 22 compares the magnitude of the loss or the like detected on the event with the threshold value (held by the parameter holding unit 24) individually determined for each type of event to automatically determine whether or not the loss is normal (Pass/Fail) for each event detected in S12 (S20). Note that determination is omitted on the detected event "uncertain splitter" excluded from the determination target in S19, and a result indicating normality (Pass) is output.

The event detection apparatus 20 holds a result of the processing of the event determination unit 22 in the measurement result holding unit 23 and reflects the content in screen display of the display unit 26 (S21). That is, information regarding the type, the loss, the determination result, and the like of each event detected by the event detection unit 21 is displayed on the screen of the OTDR measurement apparatus 30.

<Display Example of Setup List Screen>

Figure 4:
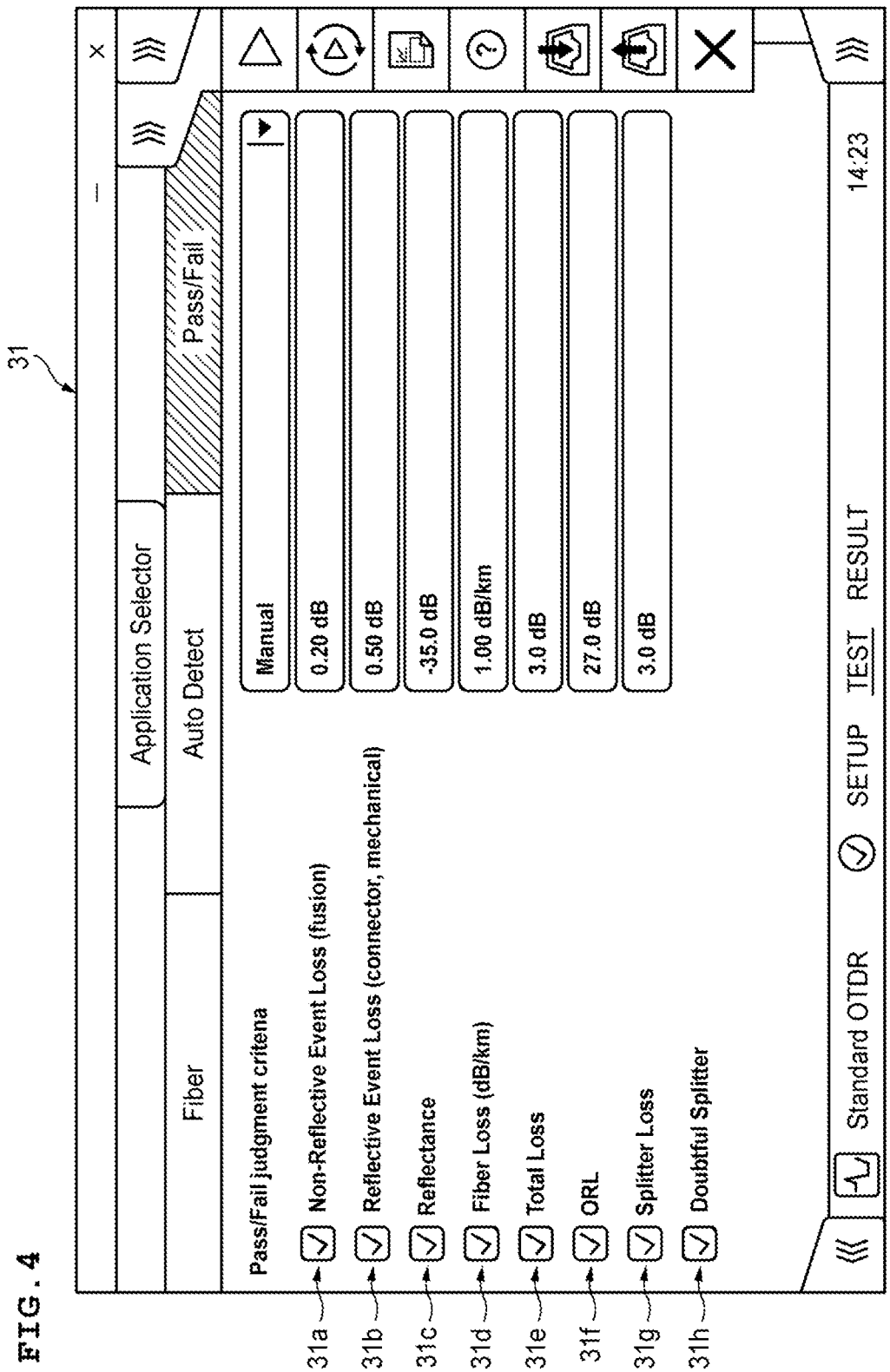
FIG. 4 is a front view showing a display example of a setup list screen.

A display example of a setup list screen 31 that is displayed on the display unit 26 is shown in FIG. 4. The setup list screen 31 represents a portion of the parameters held by the parameter holding unit 24, and the user can update each displayed parameter as needed by operating the operation input unit 25.

In the setup list screen 31 shown in FIG. 4, many setup items 31a to 31h are included. The outline of the respective setup items 31a to 31h is as follows.

31a: A loss threshold value of an event with no reflection

31b: A loss threshold value of an event with reflection (corresponding to a connector or a machine part)

31c: A reflectance threshold value

31d: An intrinsic loss threshold value [dB/km] of the optical fiber

31e: A loss (Total Loss) threshold value of the whole path

31f: An optical return loss (ORL) threshold value

31g: A loss threshold value of the splitter

31h: The presence or absence of determination of the event "uncertain splitter"

The user can select the presence or absence of determination regarding whether or not the loss is normal on the detected event "uncertain splitter" by turning on and off a check box of the setup item 31h. Determination is made that there is the determination exclusion designation when the check box is turned off, and a determination result is referred to in Step S18 of FIG. 3.

<Display Example of Result Display Screen>

Figure 5:
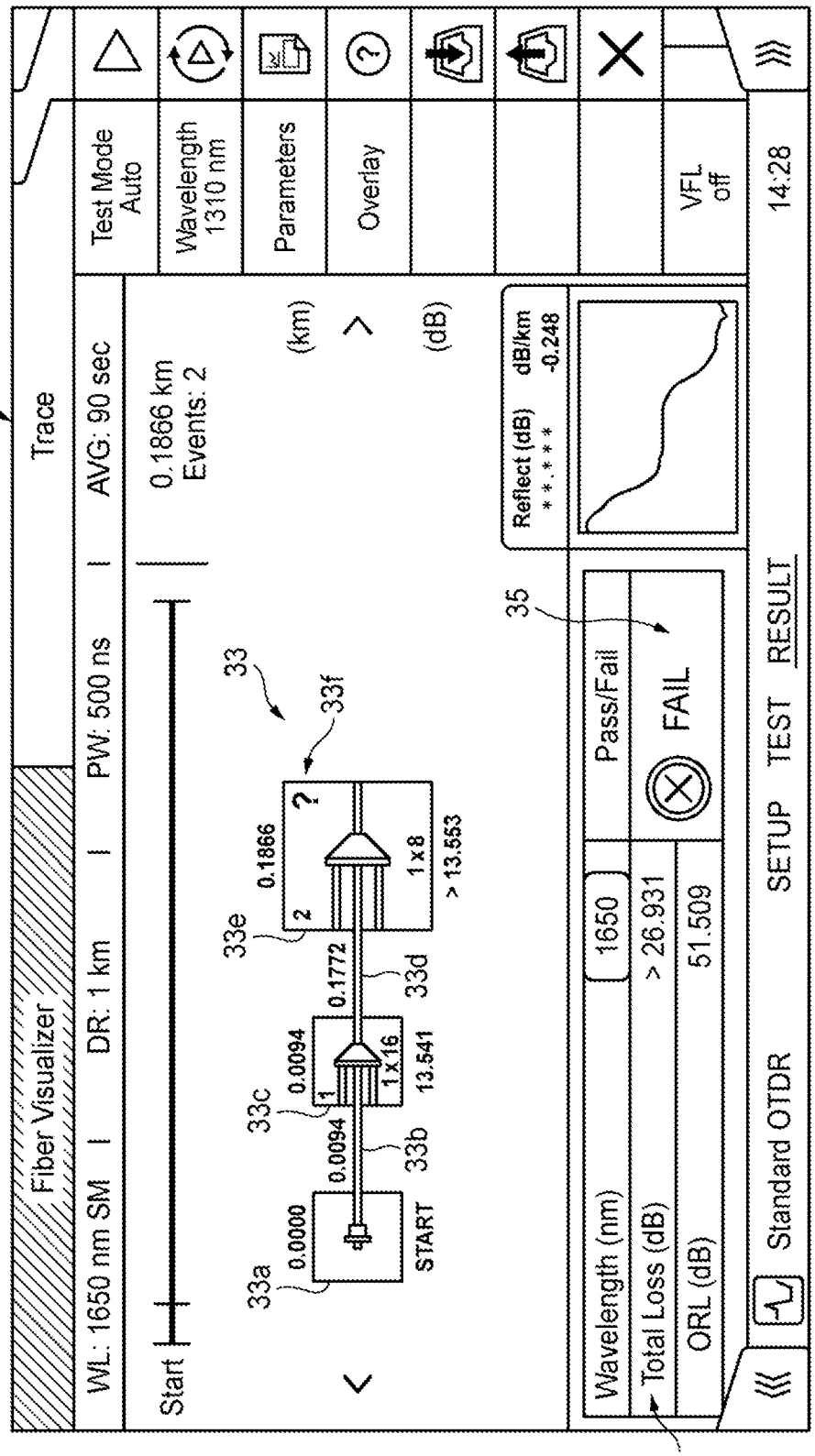
FIG. 5 is a front view showing a display example of a result display screen.

A display example of the result display screen 32 displayed on the display unit 26 is shown in FIG. 5. That is, after the event detection apparatus 20 performs the operation of FIG. 3, a screen shown in FIG. 5 can be displayed based on information regarding the measurement result held by the measurement result holding unit 23.

In the example shown in FIG. 5, various display areas, such as target network display 33, a total loss display portion 34, and a determination result display portion 35 are provided in the result display screen 32.

The target network display 33 graphically displays the configuration or characteristic of the PON communication network 40 tested by the OTDR measurement apparatus 30 based on the measurement result using figures or characters. In the example of FIG. 5, each figure pattern of a start end portion 33a, an optical fiber 33b, a splitter 33c, an optical fiber 33d, and a splitter 33e and a mark "?" of uncertain display 33f meaning that the splitter 33e is "uncertain" are included in the target network display 33.

Here, the start end portion 33a means a place where the OTDR measurement apparatus 30 is connected, that is, a measurement start point. Each of the optical fiber 33b, the splitter 33c, the optical fiber 33d, and the splitter 33e corresponds to each event detected as a result of the operation shown in FIG. 3. In this example, since the splitter 33e corresponds to an "uncertain splitter", the mark "?" of the uncertain display 33f is displayed in the figure pattern of the splitter 33e.

A numerical value representing the distance [km] of each detected event is displayed above each figure pattern. In addition, the magnitude [dB] of the detected loss is displayed below the figure pattern of each of the splitters 33c and 33e.

The total loss display portion 34 is a loss from the position of the start end portion 33a to the last event, and represents a calculation result [dB] obtained by subtracting a level of the position of the last event from a level of the position of the start end portion 33a. Note that, in a case where the splitter 33e of the last event is recognized as an "uncertain splitter" as in FIG. 5, a calculation result obtained by adding a loss generated in the splitter 33e of the last event is displayed in the total loss display portion 34.

The determination result display portion 35 displays a determination result regarding whether or not a measurement result of a path on the PON communication network 40 to be measured is normal (Pass/Fail). That is, information representing whether or not a comparison result of the detected loss for each event with the threshold value or a comparison result of the total loss with the threshold value is normal is displayed in the determination result display portion 35. Note that, in a case where the user designates determination exclusion in advance by selecting the check box of the setup item 31h shown in FIG. 4, the loss of the splitter 33e that is an "uncertain splitter" is outside the determination target in Step S19 of FIG. 3 and is considered to be normal.

<Advantages of OTDR Measurement Apparatus>

With the above-described OTDR measurement apparatus 30, even in a case where the loss of the whole network increases and backscattered light that has light intensity decreased to about a noise level is unrecognizable because a plurality of splitters 43-1 and 43-2 are present in the path of the PON communication network 40 under test, it is possible to display the last detected event as a splitter. Furthermore, since the last detected event or an event influenced by the dead zone is explicitly indicated as an "uncertain splitter", the user easily recognizes the event in distinction from a normal splitter. In addition, since a loss or the like of an "uncertain splitter" can be excluded from a target of automatic determination, it is possible to avoid erroneous display of a place having no problem on the PON communication network 40 as failure (Fail), and to eliminate a need for a user's wasteful operation to search erroneously displayed failure.

Here, the characteristics of the OTDR measurement apparatus and the control method according to the embodiment of the invention described above are briefly summarized in the following [1] to [5].

[1] An OTDR measurement apparatus (30) that sends pulsed light into an optical fiber network (PON communication network 40) to be measured and observes return light from the optical fiber network to measure a status of the optical fiber network, the apparatus including a parameter decision unit (parameter holding unit 24, S11) that specifies a parameter N1 of the total number of optical splitters included in the optical fiber network in a case where the optical fiber network is a PON, an event detection unit (event determination unit 22) that detects each phenomenon generated corresponding to a configuration and the status of the optical fiber network as an event based on an observation status of a time-series level change of the return light and associates each of the optical splitters included in the optical fiber network with each event, a last event decision unit (S16, S17) that associates an event last detected by the event detection unit with one optical splitter in a case where the number N2 of detections of the total number of optical splitters detected by the event detection unit is smaller than the parameter N1, and a user support processing unit (S21) that explicitly outputs information regarding the last detected event as an uncertain splitter in distinction from other optical splitters in a case where the number N2 of detections is smaller than the parameter N1.

[2] The OTDR measurement apparatus described in [1] described above, in which the user support processing unit includes a normality information output unit (S18, S19, S21) that, for a specific event classified into the uncertain splitter, inhibits determination processing (S20) regarding magnitude of a loss in a part of the specific event and outputs information representing that the loss is normal.

[3] The OTDR measurement apparatus described in [1] or [2] described above, in which, even though backscattered light is incapable of being detected due to a dead zone behind one optical splitter, the user support processing unit explicitly outputs information regarding an event corresponding to the optical splitter as an uncertain splitter in distinction from other optical splitters (S16B, S17B).

[4] The OTDR measurement apparatus described in [2] described above, in which the normality information output unit has a user operation unit (operation input unit 25) that switches on and off of a function (S18, S19) of inhibiting determination processing regarding magnitude of a loss in a part of the specific event.

[5] A method for controlling an OTDR measurement apparatus that sends pulsed light into an optical fiber network to be measured and observes return light from the optical fiber network to measure a status of the optical fiber network, the method including a parameter decision step (S11) of specifying a parameter N1 of the total number of optical splitters included in the optical fiber network in a case where the optical fiber network is a PON, an event detection step (S12, S13) of detecting each phenomenon generated corresponding to a configuration and the status of the optical fiber network as an event based on an observation status of a time-series level change of the return light and associating each of the optical splitters included in the optical fiber network with each event, a last event decision step (S16, S17) of associating a last detected event with one optical splitter in a case where the number N2 of detections of the total number of optical splitters is smaller than the parameter N1, and a user support processing step (S21) of explicitly outputting information regarding the last detected event as an uncertain splitter in distinction from other optical splitters in a case where the number N2 of detections is smaller than the parameter N1.

DESCRIPTION OF REFERENCE NUMERALS AND SIGNS

10: OTDR body
20: event detection apparatus
21: event detection unit
22: event determination unit
23: measurement result holding unit
24: parameter holding unit
25: operation input unit
26: display unit
30: OTDR measurement apparatus
31: setup list screen
31a, 31b, 31c, 31d, 31e, 31f, 31g, 31h: setup item
32: result display screen
33: target network display
33a: start end portion
33b, 33d: optical fiber
33c, 33e: splitter
33f: uncertain display
34: total loss display portion
35: determination result display portion
40, 50: PON communication network
41, 51: building
42, 52: subscriber home
43, 53: splitter
44, 45, 46, 54, 55, 100: optical fiber

What is claimed is:

1. An OTDR measurement apparatus that sends pulsed light into an optical fiber network consisting of a PON and observes return light from the optical fiber network to measure a status of the optical fiber network, the apparatus comprising:
   a parameter decision unit that specifies the total number of optical splitters included in the optical fiber network as a parameter N1;
   an event detection unit that detects an event generated corresponding to a configuration and the status of the optical fiber network based on the return light;
   an event determination unit that associates each optical splitter included in the optical fiber network with the detected event, and in a case where the number N2 of detections of events associated as the optical splitters is smaller than the parameter N1, determines an event last detected by the event detection unit as an event caused by an uncertain optical splitter of the total number N1 of the optical splitters; and
   a display unit that displays the event determined as the uncertain optical splitter in distinction from other optical splitters.

2. The OTDR measurement apparatus according to claim 1,
   wherein the event determination unit outputs information representing that a loss in the event classified into the uncertain optical splitter is normal.

3. The OTDR measurement apparatus according to claim 2, further comprising:
   a user operation unit that switches on and off of a function of inhibiting determination processing regarding magnitude of a loss in a part of the event.

4. The OTDR measurement apparatus according to claim 1,
   wherein the event determination unit determines information regarding an event corresponding to an optical splitter where backscattered light is incapable of being detected due to a dead zone, as an uncertain optical splitter.

5. An OTDR measurement method that sends pulsed light into an optical fiber network consisting of a PON and observes return light from the optical fiber network to measure a status of the optical fiber network, the method comprising:
   a parameter decision step of specifying the total number of optical splitters included in the optical fiber network as a parameter N1;
   an event detection step of detecting an event generated corresponding to a configuration and the status of the optical fiber network based on the return light;
   an event determination step of associating each optical splitter included in the optical fiber network with the detected event, and in a case where the number N2 of detections of events associated as the optical splitters is smaller than the parameter N1, determining a last detected event as an event caused by an uncertain optical splitter of the total number N1 of the optical splitters; and
   a display step of displaying the event determined as the uncertain optical splitter in distinction from other optical splitters.

* * * * *